May 24, 1949.   C. M. KINCANNON   2,471,273
LANDING NET
Filed April 23, 1947
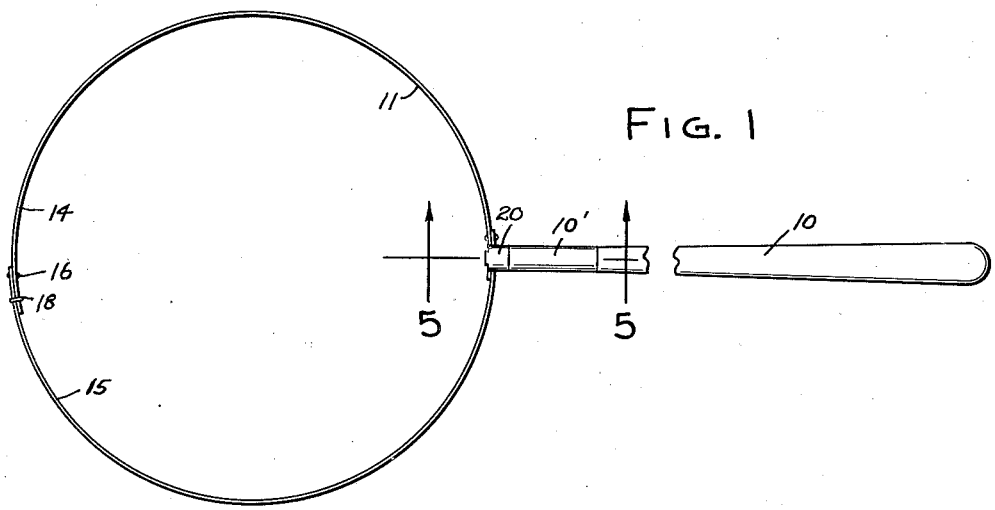
FIG. 1
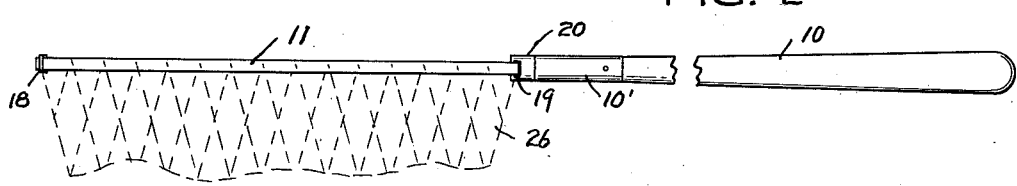
FIG. 2
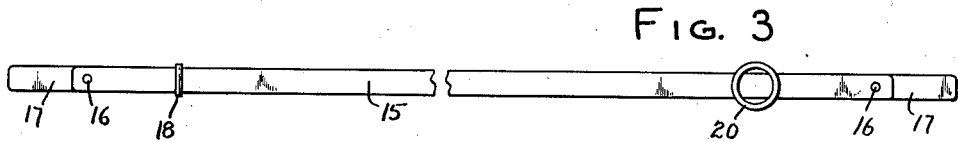
FIG. 3
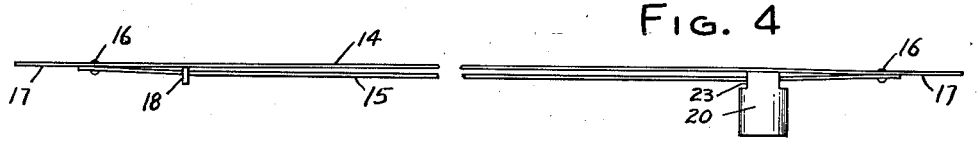
FIG. 4
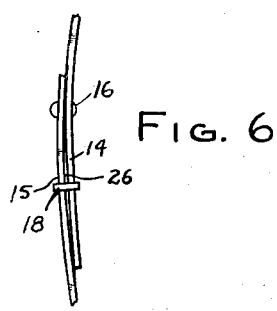
FIG. 5
FIG. 6
FIG. 7
INVENTOR.
Camilla M. Kincannon
BY
Louis O. French
ATTORNEY Patented May 24, 1949

2,471,273

UNITED STATES PATENT OFFICE 2,471,273

LANDING NET

Camilla M. Kincannon, Milwaukee, Wis.

Application April 23, 1947, Serial No. 743,432

1 Claim. (Cl. 43—12)

The invention relates to landing nets.

The object of the invention is to provide a collapsible landing net of the type in which the net frame is detachably secured to a handle formed of one or more sections, the net frame also being collapsible so as to fold into a small space.

One of the objects of the invention is to provide a collapsible landing net in which the handle is made of buoyant material, and the buoyancy of this handle is sufficient to float the net in case it happens to drop into the water.

Another object of the invention is to provide a collapsible net frame of very simple but efficient construction which embodies a pair of spring metal strips arranged in superimposed relation and pivotally connected together near the ends of the shorter strip with the ends of the longer strip cooperating with those of the shorter strip to bring the net frame to a circular form when the two strips are swung apart from their normal folded position.

A further object of the invention is to provide in combination with the collapsible net frame structure above described, a locking collar for the outermost joint of the strips and a ferrule provided with a slotted portion which clampingly engages the joint adjacent the handle when the end of the handle is screwed into the ferrule and against the strips.

The invention further consists in the several features hereinafter set forth and more particularly defined by the claim at the conclusion hereof.

In the drawings:

Fig. 1 is a plan view of a net frame structure embodying the invention, parts being broken away;

Fig. 2 is a side elevation view of the complete net, parts being broken away;

Fig. 3 is a side view of the net frame in collapsed condition;

Fig. 4 is a top view of the net frame in collapsed condition;

Fig. 5 is a detailed sectional view taken on the line 5—5 of Fig. 1;

Fig. 6 is an enlarged detailed plan view of a portion of the net frame;

Fig. 7 is a view showing a modified form of ferrule clamp.

Referring to the drawings, the numeral 10 designates generally a handle and 11 the collapsible net frame. The handle 10 is preferably formed of wood or other buoyant material and may be in either a single section or several connected together sections. It is mounted at its front end in a metal ferrule 10' and pinned thereto by a pin 12, which metal ferrule has a solid threaded end portion 13. The body part of the handle 10 is of sufficient volume or displacement, so that it will buoy up the metal parts of the net and permit the same to float in case the net is accidentally dropped into the water either from a boat, pier, or otherwise.

The net carrying frame 11 is formed of strips 14 and 15 of rectangular spring metal, such as spring steel. The strip 14 is longer than the strip 15, and the strips are pivotally secured together by rivets 16 passing through the same and disposed adjacent the ends of the short strip 15 leaving extensions 17 on the longer strip. Before the strips 14 and 15 are secured together a metal collar or slide member 18 is mounted over the strip 15, and the slotted portion 19 of an internally threaded ferrule 20 is mounted over said strip 15 so as to slide relative thereto. The ferrule 20 may be turned from a solid cylindrical member and threaded as shown at 21 and then milled out from its solid end 22 at its sides 23 so as to provide the opening in which the strip 15 slides, or said ferrule may be made from a piece of tubing which is threaded at one end and whose extended end is slotted to provide tongue portions 24 which are bent downwardly and inwardly to provide a slot 25 in which the strip 15 is inserted. The slot in the slide 18 is of a width about equal to the thickness of the two strips 14 and 15, so that it will slide over these strips when they are in abutting contact but will be held against slippage where the distance between the strips is greater than their width. The net 26 is strung or mounted on the strips so as to hang down from the same when the strips shown in the position of Fig. 3 are collapsed at their central portions and spread or sprung outwardly to the position shown in Fig. 1, this outward spreading acting to bring the extended ends 17 inside of and into abutting engagement with portions of the strip 15 back from the pivot points 16, and when so positioned, the slide 18 is moved over the abutting ends of the strips and likewise the slotted portion of the ferrule 20 is moved over the other abutting ends of the strips and then the threaded end portion 13 of the ferrule 10' is screwed inwardly relative to the threads 21 so that said end moves into abutting engagement with the adjacent strip 15 and clamps this strip and the strip 14 between its end and the end portion 22 or 24 of said ferrule, thereby securely anchoring the net to the handle.

It is also to be noted that when the net frame is opened up, the ends of the strips 14 and 15 upon which the slide 18 is mounted have a tendency to spring away in the region designated by the numeral 26 which is between the end of the extension 17 and the rivet 16, so that when the slide 18 is moved over this portion, these parts will spring back and act to prevent the slide 18 from slipping off of the jointed ends of the strips.

The net when assembled is used in the same manner as any landing net, but because of its collapsible features, it may be readily stored in a small space and because of its relatively light though strong frame construction, it may be readily floated by using a wooden handle which is not so bulky but that it may be readily grasped by the hand of the operator.

I desire it to be understood that this invention is not to be limited to any particular form or arrangement of parts except in so far as such limitations are included in the claim.

What I claim as my invention is:

In a landing net, the combination of a handle, a net frame comprising a pair of resilient strips, one of said strips being longer than and having its ends extended beyond the other strip, said strips being pivotally connected together near the ends of said shorter strip thereby constituting joints and movable relative to each other to form a hoop with the extended ends of the longer strip disposed inside the ends of the shorter strip and the outermost of said joints so formed having the medial portion of the adjacent strips at that joint spaced apart, a locking collar cooperable with the parts of said outermost joint and movable over said medial portion to a location to hold the outermost joint of said frame in the plane of the innermost of said joints, and means connected with the handle for locking the innermost joint formed by the other extended end of the longer strip and the adjacent portion of the shorter strip in the opened up position of said members.

CAMILLA M. KINCANNON.

REFERENCES CITED

The following references are of record in the file of this patent:

UNITED STATES PATENTS

| Number | Name | Date |
| --- | --- | --- |
| 382,317 | McClintock | May 8, 1888 |
| 481,461 | Benson | Aug. 23, 1892 |
| 752,550 | Heritage | Feb. 16, 1904 |
| 785,571 | Raines et al. | Mar. 21, 1905 |
| 803,325 | Brennaaun | Oct. 31, 1905 |
| 1,077,481 | Levy | Nov. 4, 1913 |
| 1,231,735 | Harris | July 3, 1917 |
| 1,351,628 | Dukas | Aug. 31, 1920 |
| 1,366,145 | Wolf | Jan. 18, 1921 |
| 1,657,892 | Muldoon | Jan. 31, 1928 |